(12) United States Patent
Du Breuil et al.

(10) Patent No.: US 7,769,370 B2
(45) Date of Patent: Aug. 3, 2010

(54) METHOD AND SYSTEM FOR PAIRING ELECTRONIC DEVICES

(75) Inventors: Thomas L. Du Breuil, Ivyland, PA (US); David C. Goodwin, Holland, PA (US); Allen Lee, Los Altos, CA (US)

(73) Assignee: Motorola, Inc., Schaumburg, IL (US)

( * ) Notice: Subject to any disclaimer, the term of this patent is extended or adjusted under 35 U.S.C. 154(b) by 641 days.

(21) Appl. No.: 11/616,357

(22) Filed: Dec. 27, 2006

(65) Prior Publication Data
US 2008/0157993 A1 Jul. 3, 2008

(51) Int. Cl.
*H04M 3/00* (2006.01)
(52) U.S. Cl. ............... 455/420; 455/41.1; 455/41.2; 455/569.1
(58) Field of Classification Search .......... 455/41.1, 455/41.2, 569.1, 419, 420, 517, 550.1, 556.1, 455/424, 425; 340/825.22, 825.69
See application file for complete search history.

(56) References Cited

U.S. PATENT DOCUMENTS

| | | | |
|---|---|---|---|
| 4,056,808 A | 11/1977 | Benhamou | |
| 5,900,867 A | 5/1999 | Schindler et al. | |
| 6,681,108 B1 * | 1/2004 | Terry et al. | 455/412.2 |
| 2002/0111141 A1 * | 8/2002 | Furukawa | 455/41 |
| 2003/0050009 A1 * | 3/2003 | Kurisko et al. | 455/41 |
| 2006/0270465 A1 * | 11/2006 | Lee et al. | 455/569.1 |
| 2007/0124372 A1 * | 5/2007 | Liu et al. | 709/204 |
| 2007/0294297 A1 * | 12/2007 | Kesteloot et al. | 707/104.1 |
| 2008/0003997 A1 * | 1/2008 | Parkkinen et al. | 455/421 |

OTHER PUBLICATIONS

Lee W. Young, "Corresponding Application PCT/US2007/083565—PCT International Search Report and Written Opinion," WIPO, ISA/US, Commissioner for Patents, Alexandria, VA, USA, May 20, 2008, 9 pages, most relevant pp. 3, 6-9.
Simin Baharlou, "Corresponding Application PCT/US2007/083565—PCT International Preliminary Report on Patentability," The International Bureau of WIPO, Geneva, Switzerland, Jul. 9, 2009, 8 pages, most relevant pp. 2, 5-8.

* cited by examiner

*Primary Examiner*—Patrick N Edouard
*Assistant Examiner*—Wayne Cai (57) ABSTRACT

A method and system for facilitating communication, generally called pairing, between a wireless handheld device and a electronic communication device is disclosed. The method includes transmitting a line-of-sight signal from the wireless handheld device to a electronic communication device. The line-of-sight signal serves to identify the wireless handheld device. This transmission results in a received line-of-sight signal at the electronic communication device. The method also includes enabling a non-line-of-sight communication between the wireless handheld device and the electronic communication device. The non-line-of-sight communication is enabled on the basis of the received line-of-sight signal.

24 Claims, 5 Drawing Sheets

METHOD AND SYSTEM FOR PAIRING ELECTRONIC DEVICES

The present invention generally relates to electronic communication devices, and more particularly, to a method and system for pairing the electronic devices.

BACKGROUND OF THE INVENTION

The use of electronic devices has become increasingly common in today's world. Examples of electronic devices include television (TV) sets, Digital Versatile Disk (DVD) players, audio players, security-monitoring devices, gaming consoles, and so forth. The operations of these electronic devices can be controlled by using control buttons that are located on the device. For example, a TV channel can be tuned by pushing a button on the TV set. This, however, requires a user of the electronic device to be present near the device, which is time-consuming and inconvenient when the device has to be operated frequently.

There are wireless handheld devices that can operate an electronic device from a remote location. Such wireless handheld devices can be TV remote control devices, wireless game pads, DVD player remote control devices, and so forth. For example, TV channels can be tuned by using a TV remote control device from a distance. Another example is a Bluetooth headset used with a mobile phone. Typically, such wireless handheld device use infrared-based or radio-frequency-based signals to communicate with these electronic devices.

However, to operate an infrared-based wireless handheld device, it has to be pointed in the direction of the receiver of the electronic device. For example, a TV set can be operated by an infrared-based remote control device by pointing the infrared-based remote control device towards the TV set. Further, radio-frequency-based wireless handheld devices do not need to be pointed in the direction of the electronic device. However, all the electronic devices that fall in the range of the radio-frequency-based device get operated simultaneously. If a particular device has to be operated, then the device has to be manually selected at radio-frequency-based wireless handheld devices by a user. This causes inconvenience to the users, especially when operation has to be performed frequently, for example, a user may have to change channels of a TV set frequently.

There are many such instances where electronic communication devices are intended to work together, but in order to do so, they must first be linked to each other in a process called pairing. Traditionally, pairing is a manual operation performed by either the end user of the electronic communication devices when they are first installing and configuring the devices, or during the manufacturing process of the devices. Therefore, there is a need in the art for a method and system for both automating pairing as well as making it dynamic, i.e., easily changing the pairing at any time.

BRIEF DESCRIPTION OF THE FIGURES

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

Skilled artisans will appreciate that elements in the figures are illustrated for simplicity and clarity and have not necessarily been drawn to scale. For example, the dimensions of some of the elements in the figures may be exaggerated, relative to other elements, to help in improving an understanding of the embodiments of the present invention.

DETAILED DESCRIPTION

Before describing in detail the particular method and system for facilitating communication between electronic communication devices, it should be observed that the present invention resides primarily in combinations of method steps related to the method and system for facilitating communication between electronic communication devices. Accordingly, the apparatus components and method steps have been represented, where appropriate, by conventional symbols in the drawings, showing only those specific details that are pertinent for an understanding of the present invention, so as not to obscure the disclosure with details that will be readily apparent to those with ordinary skill in the art, having the benefit of the description herein.

In this document, the terms 'comprises,' 'comprising,' or any other variation thereof, are intended to cover a non-exclusive inclusion, such that a process, method, article or apparatus that comprises a list of elements does not include only those elements but may include other elements that are not expressly listed or inherent in such a process, method, article or apparatus. An element proceeded by 'comprises . . . a', does not, without more constraints, preclude the existence of additional identical elements in the process, method, article or apparatus that comprises the element. The term 'another,' as used in this document, is defined as at least a second or more. The terms 'includes' and/or 'having', as used herein, are defined as comprising.

For one embodiment, a method for facilitating communication between a wireless handheld device and an electronic communication device is provided. The method includes transmitting a line-of-sight signal from the wireless handheld device to the electronic communication device. The line-of-sight signal serves to identify the wireless handheld device. The method also enables a non-line-of-sight communication between the wireless handheld device and the electronic communication device. The non-line-of-sight communication is enabled on the basis of a previously received line-of-sight signal.

For another embodiment, a wireless handheld device is provided. This wireless handheld device includes a transmitter and a transceiver. The transmitter can transmit a line-of-sight signal to an electronic communication device. The line-of-sight signal identifies the wireless handheld device to the electronic communication device. The line-of-sight signal also initiates the process of pairing the wireless handheld device with the electronic communication device. The transceiver thereafter communicates via a non-line-of-sight signal with the line-of-sight identified electronic communication device until a new line-of-sight electronic communication device is identified, at which time, the pairing switches to the new device. The transceiver communicates with the electronic communication device on the successful pairing of the wireless handheld device with the electronic communication device. The successful pairing of the wireless handheld device with the electronic communication device is a consequence of the electronic communication device receiving the line-of-sight signal.

For yet another embodiment, a electronic communication device is provided. The electronic communication device has a receiver and a transceiver. The receiver receives a line-of-sight signal from a wireless handheld device. The line-of-sight signal identifies the a wireless handheld device to the electronic communication device. The line-of-sight signal initiates the process of pairing the electronic communication device with the wireless handheld device. The transceiver is adapted to communicate via a non-line-of-sight signal with the wireless handheld device. The transceiver communicates with the wireless handheld device on the successful pairing of the electronic communication device with the wireless handheld device. The successful pairing of the electronic communication device with the wireless handheld device is the consequence of the electronic communication device receiving the line-of-sight signal.

Figure 1:
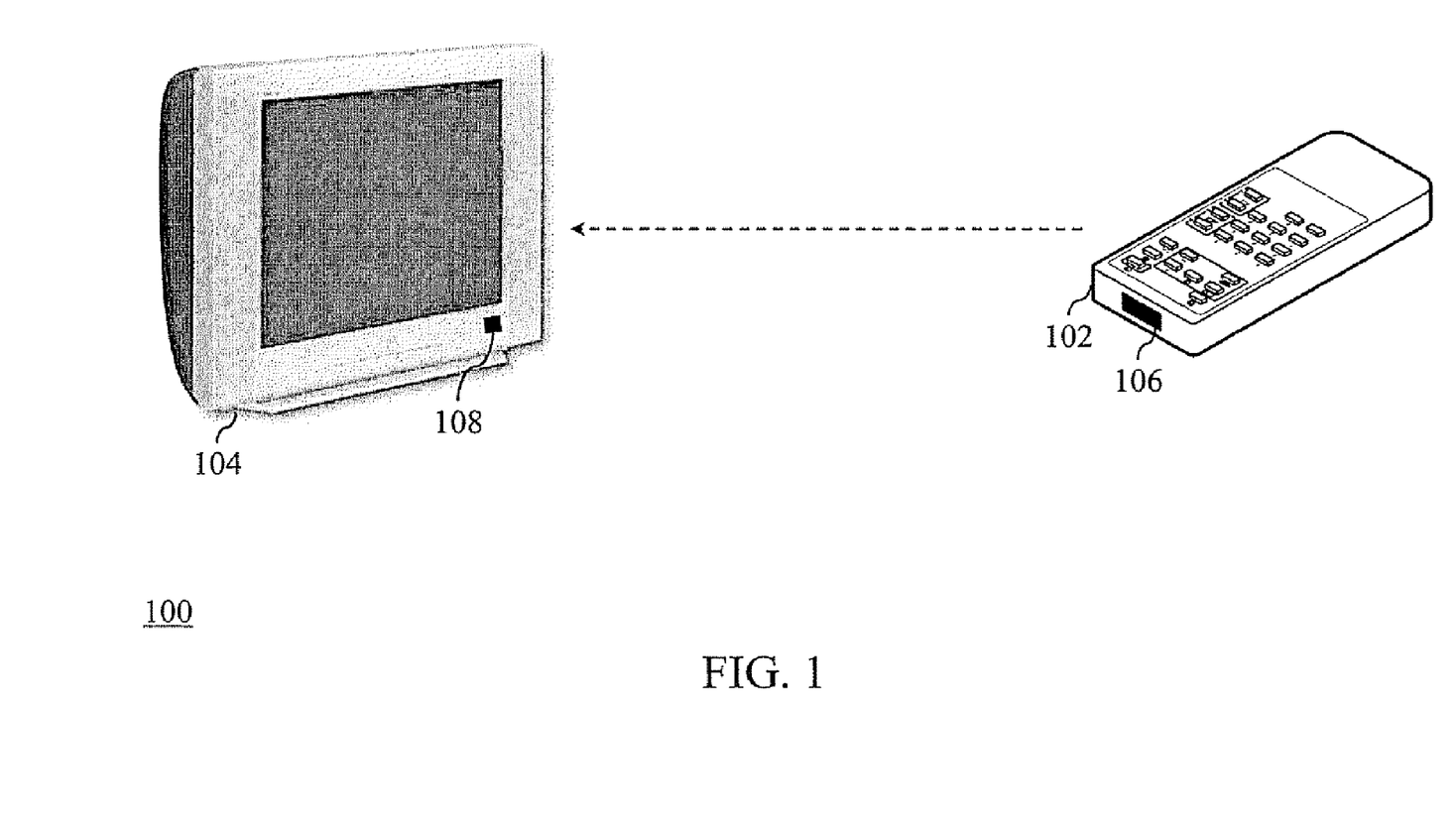
FIG. 1 illustrates an exemplary environment where various embodiments of the present invention can be practiced.

FIG. 1 illustrates an exemplary environment 100 where various embodiments of the present invention can be practiced. The environment 100 includes a wireless handheld device 102 and a electronic communication device 104. Hereinafter, the electronic communication device 104 will be referred to as the electronic communication device 104, for the sake of clarity. The wireless handheld device 102 is depicted as a TV remote control device in FIG. 1. However, it will be apparent to a person ordinarily skilled in the art that the wireless handheld device 102 can be any other electronic device such as a wireless game pad, a digital versatile disk (DVD) remote control or a Bluetooth headset for a mobile phone.

The wireless handheld device 102, such as a TV remote control device, can be used to operate the electronic communication device 104, for example, a TV set. The electronic communication device 104 can be a TV set, a DVD player, a mobile phone, a refrigerator, a microwave, a car security system, and so forth. The wireless handheld device 102 can communicate with the electronic communication device 104 by transmitting a line-of-sight signal and/or a non-line-of-sight signal. The line-of-sight signal can be an infrared-based signal, a laser signal, a visible light signal or a non-visible light signal that travels in a straight path. The non-line-of-sight signal can be a radio-frequency-based signal, an electromagnetic radiation, an ultrasonic signal or a sonic signal that can travel in omni directions. It should be noted that the invention can be practiced by using any other type of line-of-sight signal and non-line-of-sight signal apart from those mentioned in the application. The line-of-sight signal is transmitted from a transmitter port 106 of the wireless handheld device 102 to a receiver port 108 of the electronic communication device 104; the non-line-of-sight signals may be transmitted and received via ports 106 and 108, but may be located elsewhere in devices 102 and 104 as well. For example, to tune a TV channel using a conventional infrared (IR) remote, a user has to point the infrared-based TV remote control device at the receiver port of the TV set. The TV channel is tuned when the TV receives the infrared signal from the remote.

Figure 2:
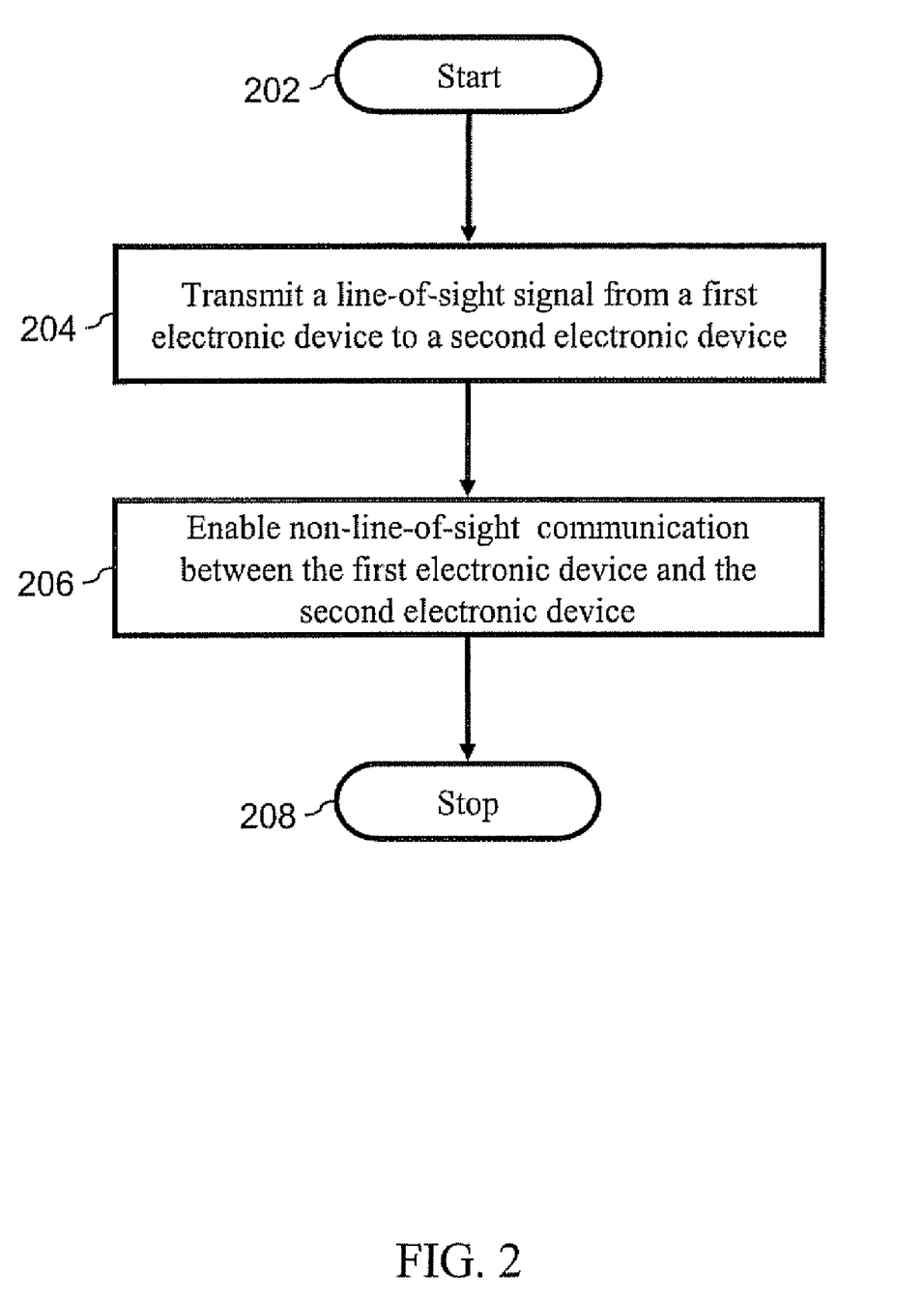
FIG. 2 is a flow diagram illustrating a method for facilitating communication between a wireless handheld device and an electronic communication device, in accordance with an embodiment of the present invention.

FIG. 2 is a flow diagram illustrating a method for facilitating communication between the wireless handheld device 102 and the electronic communication device 104, in accordance with an embodiment of the present invention. Hereinafter, the electronic communication device 104 will be referred to as the electronic communication device 104, for the sake of clarity.

The method is initiated at step 202. At step 204, a line-of-sight signal is transmitted from the wireless handheld device 102 to the electronic communication device 104, to identify the electronic communication device 104. For example, an infrared-based signal is transmitted from the TV remote control device to the TV set, to identify the TV set. At step 206, a non-line-of-sight communication is enabled between the wireless handheld device 102 and the electronic communication device 104. The non-line-of-sight communication is enabled on the basis of the line of the sight signal received. For example, subsequent to the TV set being identified by the TV remote control device by using the infrared-based signal, the TV set can be operated by using the radio-frequency-based signal. Thereafter, the method terminates at step 208 and continues to communicate via the non-line-of-sight method until the communication link is reset by the detection of 204 at a new electronic communication device.

In an embodiment where there are a plurality of networked set top boxes or other media devices, the method of FIG. 2 may also be employed. In this embodiment, an initial pairing has already taken place between the remote control, i.e., wireless handheld device, and the set top box, i.e., electronic communication device. When a user attempts to use the remote control on a new set top box, the new set top box receives the IR message from the remote control, and generates a message to the other set tops on the network telling them that it is taking over the remote control communications and any other set top currently paired with that remote should break that pairing.

Some embodiments may comprise a scenario where the plurality of set top boxes or media devices are not networked. One embodiment for handling this scenario comprises adding a "break pairing" function to the remote control. In this embodiment, when a user of a remote control would like to control another device, the user would initiate the "break pairing" function before attempting a pairing with the new device.

Figure 3:
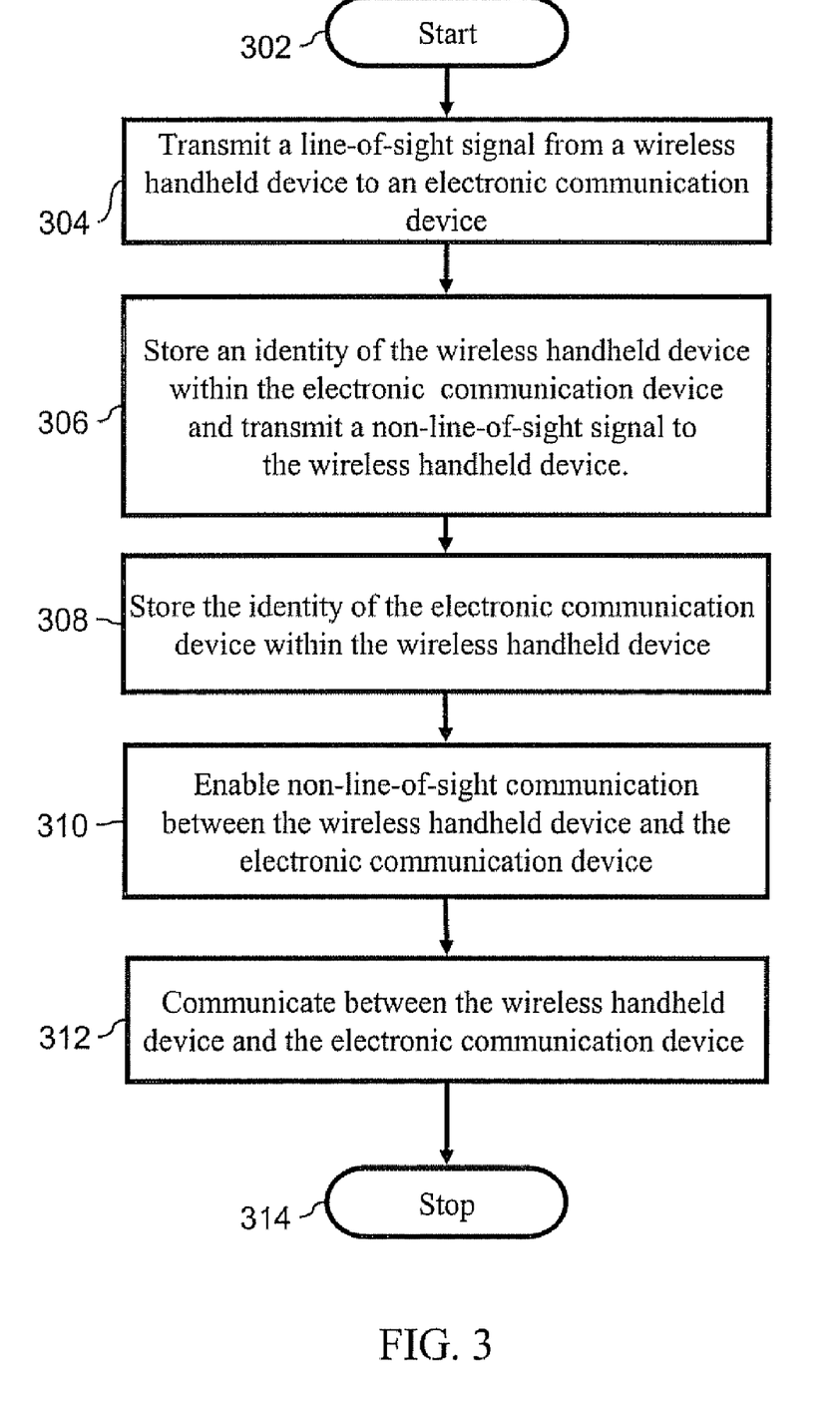
FIG. 3 is a flow diagram illustrating a method for facilitating communication between a wireless handheld device and an electronic communication device, in accordance with another embodiment of the present invention.

FIG. 3 is a flow diagram illustrating a method for facilitating communication between the wireless handheld device 102 and the a electronic communication device 104, in accordance with another embodiment of the present invention.

The method is initiated at step 302. At step 304, a line-of-sight signal is transmitted from the wireless handheld device 102 to the electronic communication device 104, to identify the electronic communication device 104.

At step 306, the identity of the wireless handheld device 102 is stored in the electronic communication device 104, to enable continued non-line-of-sight communication with the wireless handheld device 102. For example, the identity of the remote control is stored in the radio-frequency-based TV set when the infrared-based signal is transmitted from the remote control device to the radio-frequency-based TV set. The identity of the remote control is stored in the radio-frequency-based TV set, to enable the non-line-of-sight communication between the radio-frequency-based TV set and the remote control device. Thereby, an operation such as the channel tuning operation of the radio-frequency-based TV set can be controlled. Step 306 also includes the electronic communication device transmitting a non-line-of-sight signal back to the wireless handheld device.

At step 308, the identity of the electronic communication device 104 is stored in the wireless handheld device 102, to enable continued non-line-of-sight communication with the electronic communication device 104. For example, the identity of the radio-frequency-based remote control device is stored in the TV set when the infrared-based signal is transmitted from the remote control device to the radio-frequency-based TV set. The identity of the radio-frequency-based remote control device is stored in the TV set, to enable non-line-of-sight communication between the remote control device and the radio-frequency-based TV set. In this example, typical remote control devices are one way in that they transmit control information to a device such as a TV set. But the same method may be used to enable a full two way communications link by also storing the identity of the TV set in the remote control device as shown in 308. Non-line-of-sight communication is enabled between the wireless handheld device 102 and the electronic communication device 104 after the wireless handheld device 102 is paired with the electronic communication device 104. The pairing of the wireless handheld device 102 with the electronic communication device 104 implies that whenever a non-line-of-sight signal is transmitted from the wireless handheld device 102, it is received at the electronic communication device 104 and vice versa in a full two way communications link. For example, after the remote control device and the radio-frequency-based TV set are paired, the radio-frequency-based signals transmitted by the remote control are received at the radio-frequency-based TV set, irrespective of other radio-frequency-based electronic devices present. Similarly, communications sent by the TV are similarly received back to the remote control, also irrespective of other radio-frequency-based electronic devices present. Note that the pairing may be changed at anytime by pointing the wireless handheld device 102 at a new electronic communication device, which would re-initiate the pairing process and sever the current non-line-of-sight link with the current electronic communication device, 104.

At step 310, non-line-of-sight communication is enabled between the wireless handheld device 102 and the electronic communication device 104 by the non-line-of-sight signal being transmitted from the wireless handheld device 102 to the electronic communication device 104. For example, a remote control device can operate a TV set by using radio-frequency-based signals when non-line-of-sight communication is enabled between them.

At step 312, an operation of the electronic communication device 104 is controlled as a function of the non-line-of-sight communication with the wireless handheld device 102. For example, a remote control can operate a TV set by using a radio-frequency-based signal. The operation of the radio-frequency-based TV set, such as a channel tuning operation, is a function of the radio-frequency-based signal transmitted from the remote control. Thereafter, the method terminates at step 314.

In one embodiment, the non-line-of-sight communication comprises an electromagnetic radiation. In another embodiment, the non-line-of-sight communication comprises an ultrasonic signal. In another embodiment, the non-line-of-sight communication comprises a sonic signal. In another embodiment, the line-of-sight communication comprises a visible light signal. In yet another embodiment, the line-of-sight communication comprises a non-visible light signal.

Figure 4:
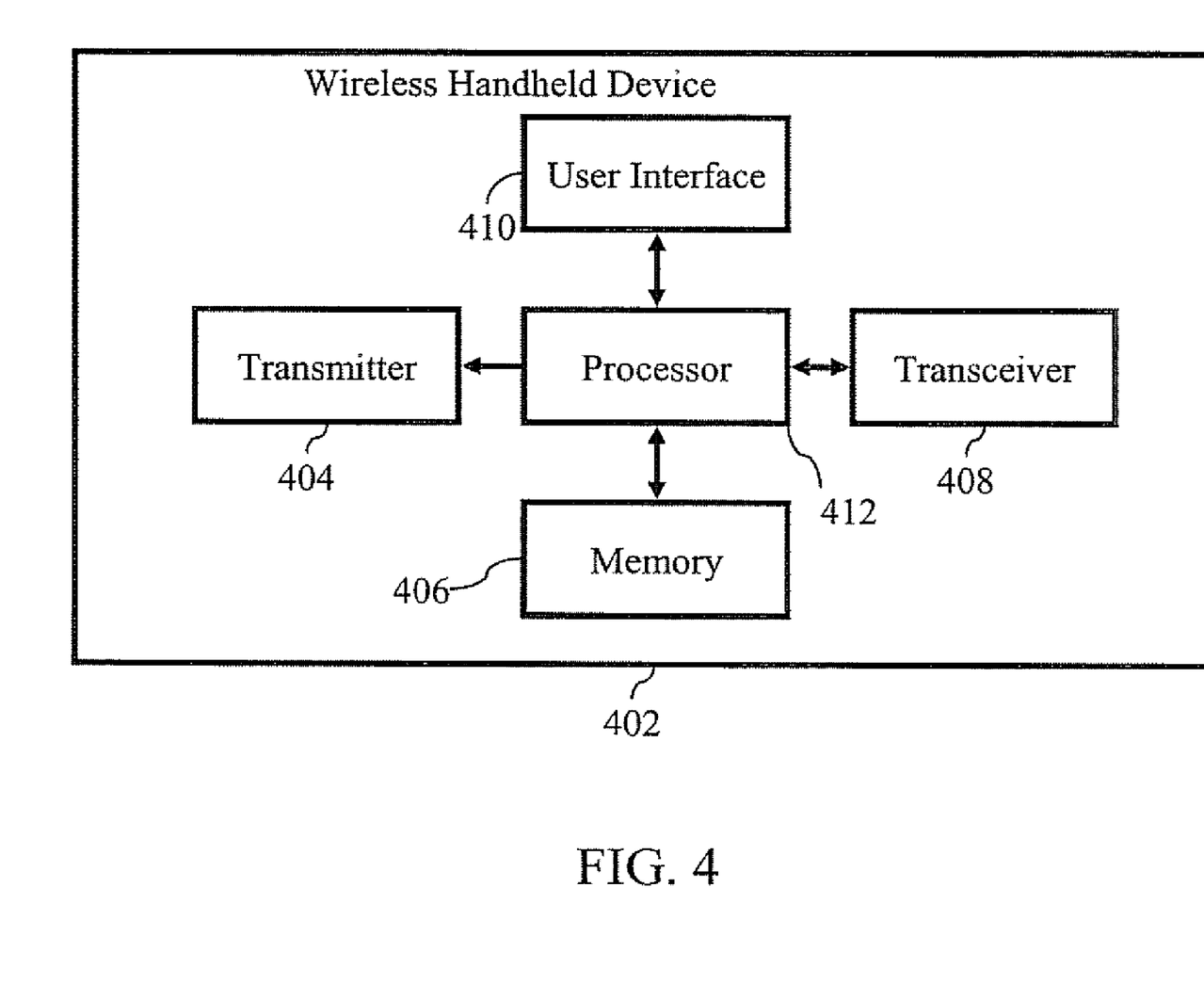
FIG. 4 illustrates a block diagram of a wireless handheld device, in accordance with an embodiment of the present invention.

FIG. 4 illustrates a block diagram of a wireless handheld device 402, in accordance with an embodiment of the present invention. The wireless handheld device 402 is described with respect to the environment 100 in FIG. 1. The wireless handheld device 402 includes a transmitter 404, a memory 406, a transceiver 408, a user interface 410, and processor 412. The wireless handheld device 402 can be a remote control device, a mobile phone a Bluetooth headset, a game pad, a DVD remote control, and so forth. The wireless handheld device 402 can control the operations of an electronic communication device such as a TV set, a DVD player, and so forth. In one embodiment, the wireless handheld device 402 can be the wireless handheld device 102.

The transmitter 404 in the wireless handheld device 402 can transmit a line-of-sight signal to at least one electronic communication device such as the electronic communication device 104. The line-of-sight signal identifies the wireless handheld device 402 to the electronic communication device. The identification of the wireless handheld device 402 to the electronic communication device initiates the process of pairing the wireless handheld device 402 with the electronic communication device. Thereby, the subsequent reception of the radio-frequency-based signals from the wireless handheld device 402 can operate the electronic communication device. For example, an infrared-based signal transmitted from a remote control identifies the remote control device to a radio-frequency-based TV set.

After the successful pairing of the wireless handheld device 402 with the electronic communication device, the transceiver 408 of the wireless handheld device 402 can be adapted to communicate with the electronic communication device. The transceiver 408 communicates via a non-line-of-sight signal. For example, a transceiver of a remote control can communicate with a TV set via the radio-frequency-based signal after the successful pairing of the remote control with the TV set. The successful pairing is a consequence of the reception of the line-of-sight signal by the electronic communication device.

In an embodiment, the wireless handheld device 402 includes the memory 406, which can be storage medium such as a Random Access Memory (RAM). The memory 406 can be a memory means used to store the identity of the electronic communication device within the wireless handheld device 402. The memory 406 stores the identity to enable non-line-of-sight communication with the electronic communication device. For example, the storage of the identity of a radio-frequency-based TV set in the memory of a remote control enables the successful pairing of the remote control device with the radio-frequency-based TV set. Thereafter, non-line-of-sight communication is enabled between the remote control device and the radio-frequency-based TV set.

In an embodiment, the wireless handheld device 402 includes the user interface 410, which facilitates the operation of the electronic communication device. The user interface 410 can be a keypad, a touchpad, a touch screen and so forth. The operation of the electronic communication device is facilitated by non-line-of-sight communication. For example, the keypad of a remote control device can be the user interface 410 of the remote control through which a user can operate a TV set by transmitting an infrared-based signal or a radio-frequency-based signal.

In one embodiment, the non-line-of-sight signal can be an electromagnetic radiation. In another embodiment, the non-line-of-sight signal can be an ultrasonic signal. In another embodiment, the non-line-of-sight signal can be a sonic signal. In another embodiment, the line-of-sight signal can be a visible light signal. In yet another embodiment, the line-of-sight signal can be a non-visible light signal.

Figure 5:
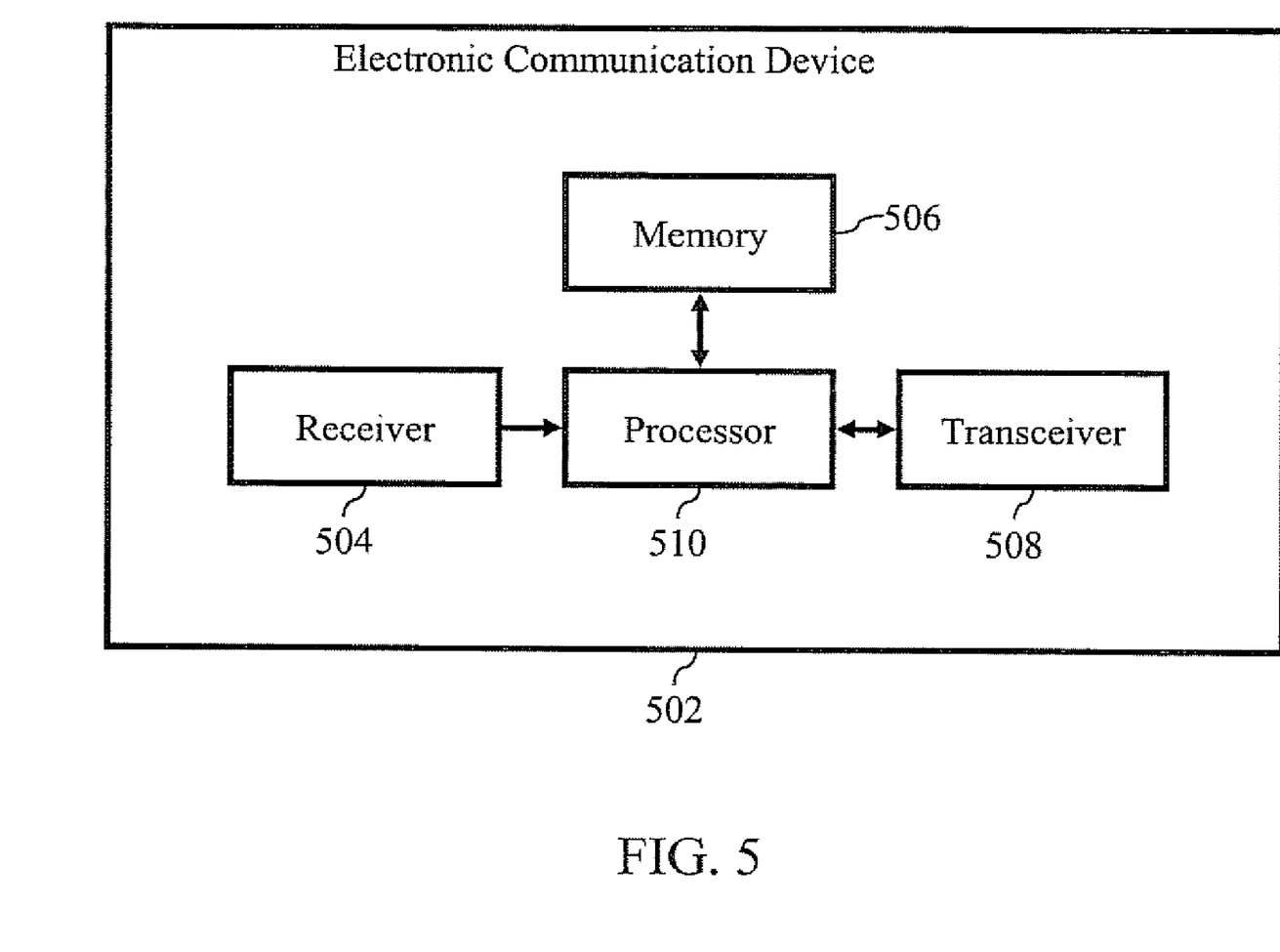
FIG. 5 illustrates a block diagram of an electronic communication device, in accordance with an embodiment of the present invention.

FIG. 5 illustrates a block diagram of a electronic communication device 502, in accordance with an embodiment of the present invention. The electronic communication device 502 is described with respect to the environment 100 in FIG. 1. The electronic communication device 502 includes a receiver 504, a memory 506, a transceiver 508, and a processor 510. The electronic communication device 502 can be a TV set, a car-security system, a mobile phone, a gaming console, a DVD player, a laptop, and so forth. The operations of the electronic communication device 502 can be controlled by wireless handheld devices such as remote control devices. In one embodiment, the electronic communication device 502 can be the electronic communication device 104.

The receiver 504 in the electronic communication device 502 can receive a line-of-sight signal from at least one wireless handheld device such as the wireless handheld device 102. The line-of-sight signal identifies the wireless handheld device to the electronic communication device 502 and initiates the process of pairing the wireless handheld device with the electronic communication device 502. This paring ensures that the subsequent reception of radio-frequency-based signals from the wireless handheld device operates the electronic communication device 502. The identification of the wireless handheld device to the electronic communication device 502 enables the pairing of the wireless handheld device with the electronic communication device 502. For example, an infrared-based signal transmitted from a remote control device identifies the remote control to a TV set. Thereafter, the TV set can be operated by the remote control device through a radio-frequency-based signal.

After the successful pairing of the wireless handheld device with the electronic communication device 502, the transceiver 508 of the electronic communication device 502 is adapted to communicate with the wireless handheld device. The transceiver 508 communicates via a non-line-of-sight signal on the successful pairing of the wireless handheld device with the electronic communication device 502. For example, the transceiver of a TV set can communicate with the remote control device via a radio-frequency-based signal after the successful pairing. This successful pairing is a consequence of the reception of the line-of-sight signal by the electronic communication device 502.

In an embodiment, the electronic communication device 502 includes the memory 506 which can be storage medium such as Random Access Memory (RAM). The memory 506 can be a memory means used to store the identity of the wireless handheld device in the electronic communication device 502. For example, the memory of a radio-frequency-based TV set can store the identity of a remote control device. The memory 506 stores the identity to enable non-line-of-sight communication with the wireless handheld device. For example, the process of storing the identity of a remote control in the memory of a TV set enables the operation of the TV set by using the radio-frequency-based signal from the remote control.

In one embodiment, the non-line-of-sight signal can be an electromagnetic radiation. In another embodiment, the non-line-of-sight signal can be an ultrasonic signal. In another embodiment, the non-line-of-sight signal can be a sonic signal. In another embodiment, the line-of-sight signal can be a visible light signal. In yet another embodiment, the line-of-sight signal can be a non-visible light signal.

The embodiments of a method for facilitating communication between electronic communication devices offer numerous advantages. The wireless handheld device need not be pointed at the electronic communication device to operate it. The wireless handheld device using the radio-frequency-based signal does not operate all the electronic devices that fall in the range of the radio-frequency-based signal. Further, manual selection of a device to operate is not required. A second advantage is that it allows the wireless handheld device to be used with multiple different electronic communication devices simply by pointing the wireless handheld device at the new electronic communication device each time the user wishes to do so. This allows a single mobile phone, for example, to be easily used as the controller for the TV sets in all rooms in a house while only controlling the particular TV in the same room as the mobile phone at any one time. A third advantage is that this system and method can be used to enhance security by requiring line-of-sight proximity to the electronic communication device as a part of the authentication and authorization process that may be used to set up such communication. This can significantly enhance security in some applications by allowing easy additions of physical (walls, doors, locks) as well as electronic security mechanisms.

It will be appreciated that the method and system for facilitating communication between electronic communication devices, described herein, may comprise one or more conventional processors and unique stored program instructions that control the one or more processors, to implement, in conjunction with certain non-processor circuits, some, most, or all of the functions of the system described herein. The non-processor circuits may include, but are not limited to, signal drivers, clock circuits, power-source circuits, and user input devices. As such, these functions may be interpreted as steps of a method to enable users to view a broadcasted media stream differently. Alternatively, some or all the functions could be implemented by a state machine that has no stored program instructions, or in one or more application-specific integrated circuits (ASICs), in which each function, or some combinations of certain of the functions, are implemented as custom logic. Of course, a combination of the two approaches could also be used. Thus, methods and means for these functions have been described herein.

It is expected that one with ordinary skill, notwithstanding possibly significant effort and many design choices motivated by, for example, available time, current technology and economic considerations, when guided by the concepts and principles disclosed herein, will be readily capable of generating such software instructions, programs and ICs with minimal experimentation.

In the foregoing specification, the invention and its benefits and advantages have been described with reference to specific embodiments. However, one with ordinary skill in the art would appreciate that various modifications and changes can be made without departing from the scope of the present invention, as set forth in the claims. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application, and all equivalents of those claims, as issued.

What is claimed is:

1. A method for pairing a wireless handheld device and an electronic communication device, the method comprising the steps of:
   transmitting a line-of-sight signal from the wireless handheld device to the electronic communication device, wherein the line-of-sight signal serves to identify the wireless handheld device to the electronic communication device to enable the pairing;
   enabling a non-line-of-sight communication between the wireless handheld device and the electronic communication device on the basis of the received line-of-sight signal; and
   breaking the pairing to allow the wireless handheld device to pair to a second electronic communication device by the second electronic communication device receiving a second line-of-sight signal from the wireless handheld device, and wherein the second electronic communication device sends a message to the electronic communication device directing the electronic communication device to break its pairing with the wireless handheld device.

2. The method as recited in claim 1, wherein the non-line-of-sight communication comprises an electromagnetic radiation.

3. The method as recited in claim 1, wherein the non-line-of-sight communication comprises one of the group of a sonic signal and an ultrasonic signal.

4. The method as recited in claim 1, wherein the line-of-sight communication comprises one of the group of a visible light signal and a non-visible light signal.

5. The method as recited in claim 1, wherein the breaking step includes providing a break pairing function to the wireless handheld device, wherein the break pairing function would be initiated on the electronic communication device before the wireless handheld device attempts a pairing with the second electronic communication device.

6. The method as recited in claim 1, further comprising the step of:
   storing an identity of the wireless handheld device within the electronic communication device for purpose of enabling continued non-line-of-sight communication with the wireless handheld device.

7. The method as recited in claim 1, further comprising the step of:
   storing an identity of the electronic communication device within the wireless handheld device for purpose of enabling continued non-line-of-sight communication with the electronic communication device.

8. The method as recited in claim 1, further comprising the step of:
   controlling an operation of the electronic communication device as a function of the non-line-of-sight communication with the wireless handheld device.

9. The method of claim 1, wherein the line-of-sight communication and non-line-of-sight communication are used to improve security by requiring visible physical access to the electronic communication device as part of an authentication and authorization process to allow further communications between the wireless handheld device and the electronic communication device.

10. A wireless handheld device comprising:
    a transmitter configured for transmitting to at least one electronic communication device a line-of-sight signal, wherein the line-of-sight signal identifies the wireless handheld device to the electronic communication device and initiates pairing of the wireless handheld device and the electronic communication device, and the transmitter configured for breaking the pairing to allow the wireless handheld device to pair to a second electronic communication device by the second electronic communication device receiving a second line-of-sight signal from the wireless handheld device, and wherein the second electronic communication device sends a message to the electronic communication device directing the electronic communication device to break its pairing with the wireless handheld device; and
    a transceiver configured for communicating via a non-line-of-sight signal with the electronic communication device upon a successful pairing of the wireless handheld device and the electronic communication device as a consequence of a reception of the line-of-sight signal by the electronic communication device.

11. The wireless handheld device of claim 10, wherein the non-line-of-sight communication comprises electromagnetic radiation.

12. The wireless handheld device of claim 10, wherein the non-line-of-sight communication comprises an ultrasonic signal.

13. The wireless handheld device of claim 10, wherein the non-line-of-sight communication comprises a sonic signal.

14. The wireless handheld device of claim 10, wherein the line-of-sight communication comprises one of the group of a visible light signal and a non-visible light signal.

15. The wireless handheld device of claim 10, wherein the wireless handheld device is provided a break pairing function, wherein the transmitter transmits a break pairing message to the electronic communication device before the wireless handheld device attempts a pairing with the second electronic communication device.

16. The wireless handheld device of claim 10, further comprising:
    a memory means for storing an identity of the electronic communication device within the wireless handheld device for purpose of enabling continued non-line-of-sight communication with the electronic communication device.

17. The wireless handheld device of claim 10, further comprising:
    a user interface configured for facilitating an operation of the electronic communication device via the non-line-of-sight communication.

18. A electronic communication device comprising:
    a receiver configured for receiving from at least one wireless handheld device a line-of-sight signal, wherein the line-of-sight signal identifies the wireless handheld device to the electronic communication device and initiates pairing of the electronic communication device and the wireless handheld device, and the receiver configured for receiving instructions directing the electronic communication device to break the pairing to allow the wireless handheld device to pair to a second electronic communication device by the second electronic communication device receiving a second line-of-sight signal from the wireless handheld device, the electronic communication device receiver receives a message from the second electronic communication device directing the electronic communication device to break its pairing with the wireless handheld device; and
    a transceiver configured for communicating via a non-line-of-sight signal with the wireless handheld device upon a successful pairing of the electronic communication device and the wireless handheld device as a consequence of a reception of the line-of-sight signal by the electronic communication device.

19. The electronic communication device of claim 18, wherein the non-line-of-sight communication comprises electromagnetic radiation.

20. The electronic communication device of claim 18, wherein the non-line-of-sight communication comprises one of the group of a sonic signal and an ultrasonic signal.

21. The electronic communication device of claim 18, wherein the line-of-sight communication comprises one of the group of a visible light signal and a non-visible light signal.

22. The electronic communication device of claim 18, wherein the electronic communication device receiver is configured for receiving a message from the wireless handheld device to break the pairing before allowing a second electronic communication device to pair with the wireless handheld device.

23. The electronic communication device of claim 18, further comprising:
   a memory means for storing an identity of the wireless handheld device within the electronic communication device for purpose of enabling continued non-line-of-sight communication with the wireless handheld device.

24. A method for pairing a wireless handheld device and an electronic communication device, the method comprising the steps of:

transmitting a line-of-sight signal from a wireless handheld device to an electronic communication device, wherein the line-of-sight signal serves to identify the wireless handheld device to the electronic communication device to enable the pairing;

storing an identity of the wireless handheld device within the electronic communication device to enable the pairing and transmitting a non-line-of-sight signal to the wireless handheld device;

storing the identity of the electronic communication device within the wireless handheld device to enable the pairing;

enabling non-line-of-sight communication between the wireless handheld device and the electronic communication device;

communicating between the wireless handheld device and the electronic communication device using non line-of-sight communication; and breaking the pairing to allow the wireless handheld device to pair to a second electronic communication device by the second electronic communication device receiving a second line-of-sight signal from the wireless handheld device, and wherein the second electronic communication device sends a message to the electronic communication device directing the electronic communication device to break its pairing with the wireless handheld device.

* * * * *